United States Patent [19]

Eriksson

[11] Patent Number: 4,987,942
[45] Date of Patent: Jan. 29, 1991

[54] COVER ARRANGEMENT, ESPECIALLY FOR VEHICLES

[75] Inventor: Jens Eriksson, Hudiksvall, Sweden

[73] Assignee: Aktiebolaget Jens Eriksson, Hudiksvall, Sweden

[21] Appl. No.: 438,391
[22] PCT Filed: Jun. 13, 1988
[86] PCT No.: PCT/SE88/00315
  § 371 Date: Dec. 20, 1989
  § 102(e) Date: Dec. 20, 1989
[87] PCT Pub. No.: WO89/00513
  PCT Pub. Date: Jan. 26, 1989

[30] Foreign Application Priority Data

Jul. 21, 1987 [SE] Sweden .................. 8702925

[51] Int. Cl.$^5$ .................................. A47H 1/00
[52] U.S. Cl. .......................... 160/243; 160/122
[58] Field of Search ........... 160/243, 122, 246, 247, 160/256; 296/98

[56] References Cited

U.S. PATENT DOCUMENTS

| | | | |
|---|---|---|---|
| 554,552 | 2/1896 | Turnbull | 160/247 |
| 1,156,807 | 10/1915 | Pepple | 160/256 |
| 1,318,820 | 10/1919 | Watkins | 296/98 |
| 1,913,902 | 6/1933 | Schofield | 160/256 |
| 2,967,733 | 1/1961 | Amerine | 296/98 |
| 2,967,734 | 1/1961 | Brown | 296/143 |
| 2,976,082 | 3/1961 | Dahlman | 296/98 |
| 3,397,009 | 8/1968 | Landenberger | 296/100 |
| 3,398,779 | 8/1968 | Kuss | 160/243 |
| 3,521,693 | 7/1970 | Kuss | 160/243 |

FOREIGN PATENT DOCUMENTS

| | | | |
|---|---|---|---|
| 785579 | 5/1968 | Canada | 160/243 |
| 0078248 | 10/1981 | France . | |
| 0018073 | 7/1979 | United Kingdom . | |

Primary Examiner—David M. Purol
Attorney, Agent, or Firm—McFadden, Fincham, Marcus & Allen

[57] ABSTRACT

A door structure including a retractable cover which has a rolling up section which is rotated so as to roll up and unroll a portion of the cover. Generally an upper edge of the cover portion is fixedly mounted to a roof portion of a door structure and the lower edge is free. The rolling up section is non-rotatably connected to the cover portion along a center line. Rotation of the rolling up section in one direction rolls up the cover portion and rotation in the other direction unrolls the cover portion. The rolling up section moves up and down respectively with the rolling up and unrolling of the cover portion. The rolling up section can be caused to rotate by toothed wheels at one end engaging with spaced rollers mounted on a framework associated with the cover. The cover portion extends, in a particular arrangement, between two end portions, although only one end portion may be provided.

5 Claims, 2 Drawing Sheets

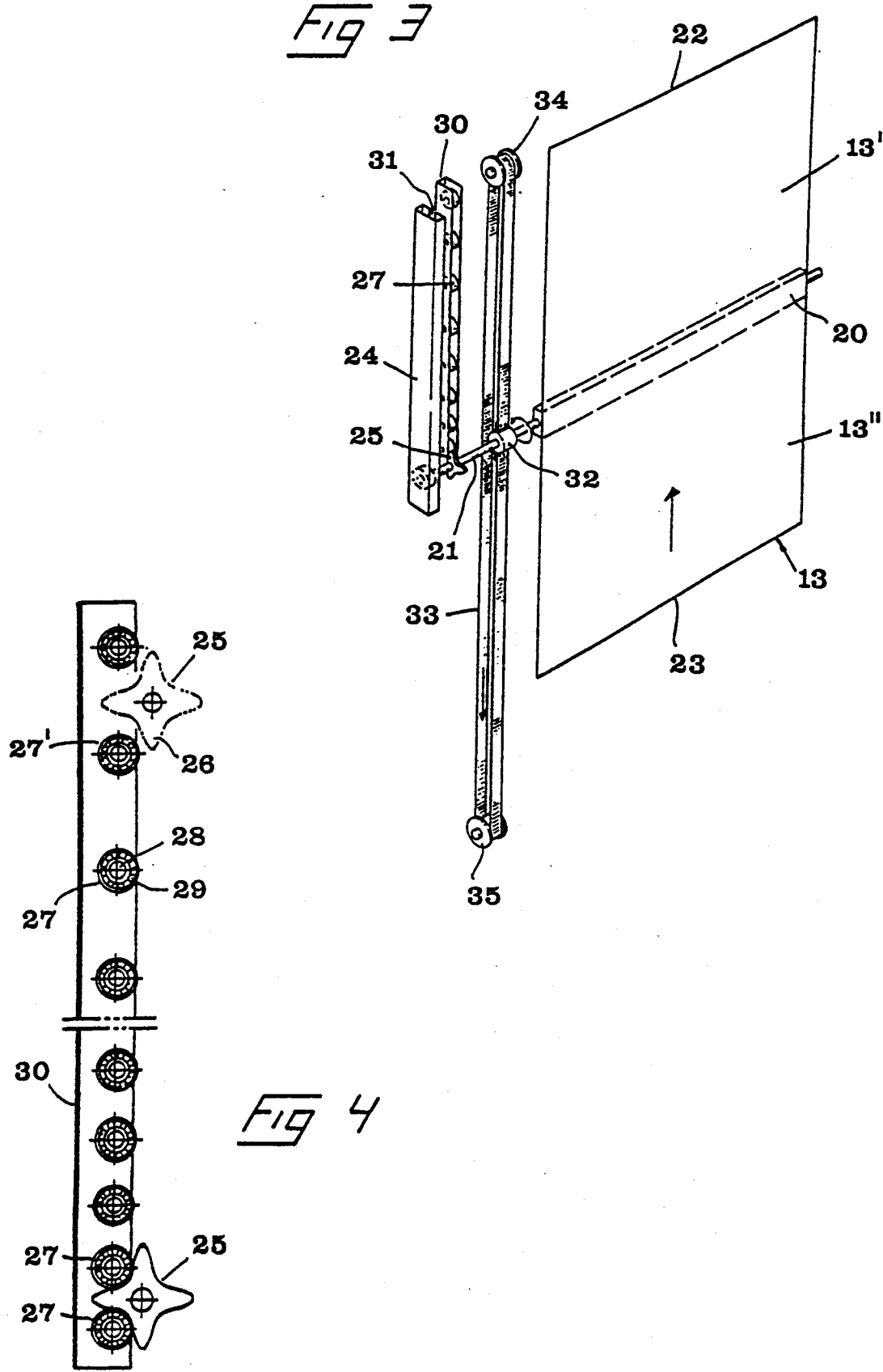

COVER ARRANGEMENT, ESPECIALLY FOR VEHICLES

TECHNICAL FIELD OF THE INVENTION

The invention relates to a cover arrangement, especially for vehicles, comprising a rolling-up rod and means for rotating the rod so as to roll up or unroll a portion of the cover on or from the rod.

BACKGROUND OF THE INVENTION

On load-carrying vehicles which are provided with a cover, the cover must frequently be rolled up and rolled down for loading and unloading of goods. Previously, the cover was rolled up to form a roll and attached by means of lugs a distance up on the frame supporting the cover. This is an inconvenient and time-consuming operation, and in recent years rolling-up means have therefore been developed which consist of a box attachable to the top of the frame or to the cover stanchions and containing a roller which resembles a roller blind rod. Such an arrangement greatly facilitates rolling-up of the cover, but suffers from the disadvantage that it must be detached and taken down when dismantling the cover frame, or if the cover is damaged. Moreover, the cover must be guided such that its vertical edges are kept perpendicular to the box to prevent wedging of the cover portion while being rolled up. A further disadvantage is that the box takes up a great deal of space, whether the cover is rolled up or lowered to its position of use.

BRIEF DESCRIPTION OF THE INVENTION

The present invention aims at providing a simple and inexpensive arrangement which eliminates the above-mentioned disadvantages and which is easily handled and can be easily dismounted from the cover frame. According to the invention, this is achieved in that the upper edge of said cover is fixedly mounted and its lower edge is free or detachable, and that the rolling-up rod is nonrotatably connected with the cover substantially along the horizontal centre line thereof, the rod, when rotated in one direction, rolling up the cover while simultaneously raising both the rod proper and the lower edge of the cover and, when rotated in the opposite direction, unrolling the cover while lowering both the rod and the lower edge of the cover.

In the inventive arrangement, the separate cover which, in practice, may be the entire side portion of a vehicle cover, can be easily and rapidly mounted on and dismounted from the cover frame and be easily and rapidly rolled up on the rolling-up rod, while uncovering the entire area which, in the position of use, is covered by the cover.

DESCRIPTION OF THE PRIOR ART

U.S. Pat. Nos. 1,318,820 and 3,397,009 disclose vehicle covers in which a rolling-up rod is per se nonrotatably connected with a cover and positioned approximately midway between the opposite cover ends. In these known arrangements, however, the rolling-up rod stays in one and the same position while the cover is being rolled up, and the two cover ends must be free to move towards the rod during the rolling-up operation. Such a permanently stationary rolling-up rod cannot be used for rolling up the side portions of a vehicle cover, since the rolling-up rod would then interfere with the loading and unloading of goods. Besides, the upper half of the cover would have to be pulled up to a covering position by special means making the arrangement even more complicated.

BRIEF DESCRIPTION OF THE DRAWINGS

In the drawings:

FIG. 3 is a respective schematic view illustrating a means for rotating the rolling-up rod; and FIG. 4 is an enlarged view of a component comprised by the means shown in FIG. 3.

DETAILED DESCRIPTION OF A PREFERRED EMBODIMENT OF THE INVENTION

Figure 1:
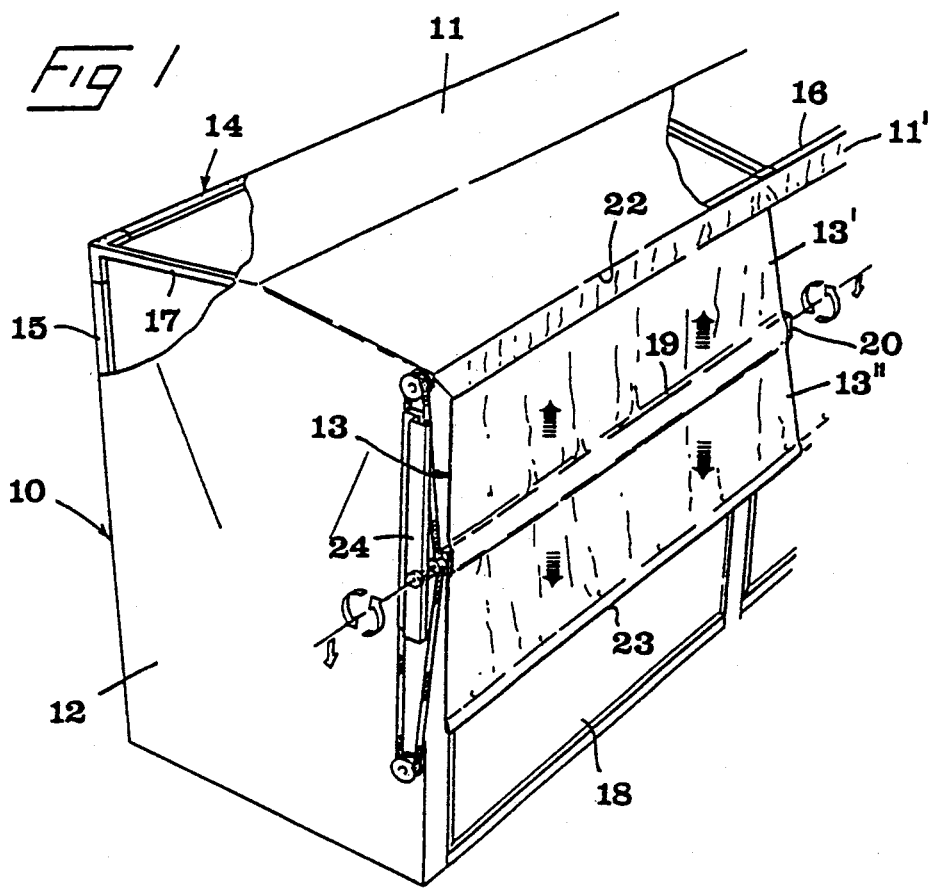
FIG. 1 is a partial side view of a vehicle cover of which a portion is in its rolled-down state.
Figure 2:
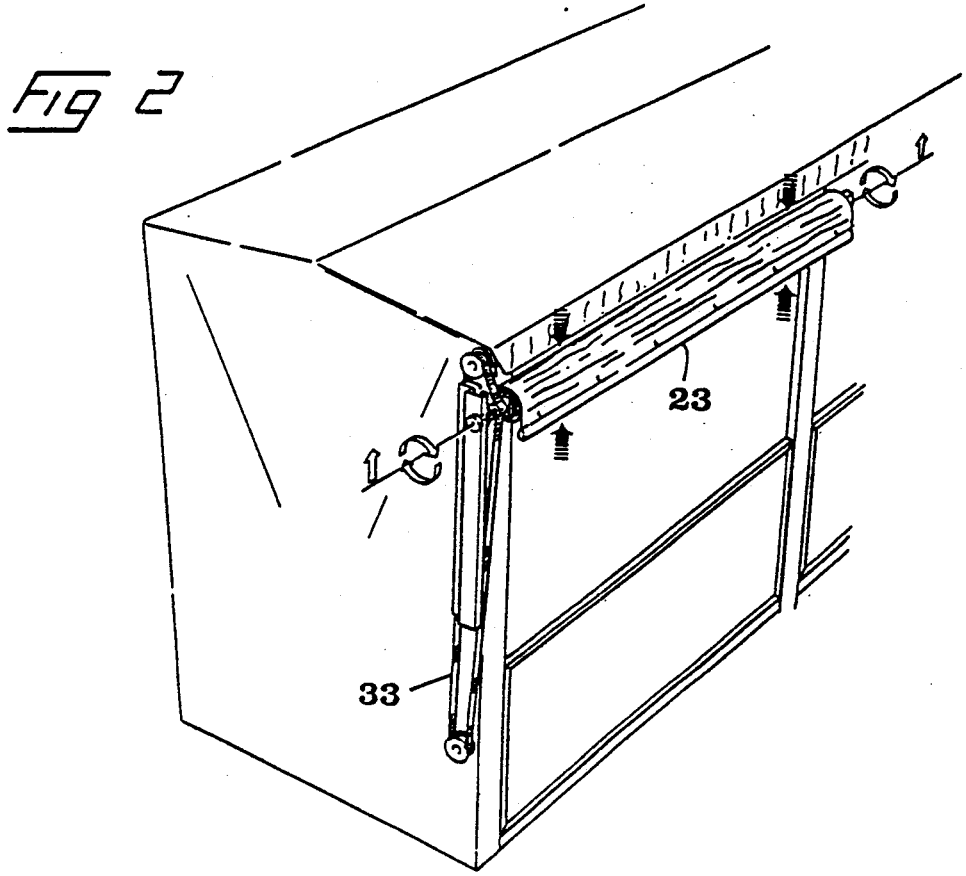
FIG. 2 is a similar perspective view in which the cover is in its rolled-up state.

In FIGS. 1 and 2, a vehicle cover generally designated 10 comprises a roof portion 11, at least one end portion 12, and one or more side portions 13 along each side of the vehicle. The cover is supported by a frame designated 14 in its entirety and containing a suitable number of vertical stanchions 15 as well as longitudinal struts 16 and cross members 17. The cover serves to cover and protect the cargo space on a vehicle platform, whether the vehicle is a traction vehicle or a trailer. The platform may be provided with dropsides 18.

Approximately in the area along its horizontal centre line, the cover side portion 13 is provided with a welded or stitched on strip defining a cavity 19. The cavity can also be formed by folding the cover in some suitable manner, instead of providing a special strip. The cavity divides the side portion 13 into an upper half 13' and lower half 13". A section 20 in the form of an aluminium tube of rectangular cross-section is inserted into the cavity 19. Because of its noncircular shape, the section is nonrotatable relative to the rest of the side portion 13. The length of the section 20 proper conforms substantially to the length of the side portion 13, but the front end of the section merges into an extension piece in the form of a rod 21 (see FIG. 3). The upper edge 22 of the side portion 13 is permanently attached to the upper part of the frame 14, more precisely to a longitudinal strut 16, while the lower edge 23 is freely movable, although it can per se, during transportation, be fixed to the dropsides 18 in some suitable manner. The upper edge of the side portion can be attached to the cover frame by some simple means, such as hooks or the like. In actual practice, the upper edge of the side portion can preferably be covered with a comparatively narrow section 11" of the roof portion, which hangs down a distance along the side of the frame.

Reference is now made to FIGS. 3 and 4 which illustrate schematically a preferred means, for rotating the section 20 which serves as a rolling-up rod. This means comprises a guide member 24 for positively guiding the rod 21 along a substantially vertical path of motion, and a carrier element 25 which, in this case, is wheel-shaped and nonrotatably mounted on the rod 21 and comprises a plurality of radially extending projections 26 for example four, having the character of cogs. In practice, a so-called star wheel can conveniently be used as the carrier element. The projections 26 are adapted to engage one by one into the interspaces between a series of tooth or lug means 27 which are located at a centre distance from each other that increases, preferably progressively, upwardly along said guide member. The carrier element moves the rod upwardly along said guide member and causes it to rotate at a successively decreasing speed. In the preferred embodiment, the lug means 27 have the shape of rollers or rings which are rotatably mounted on associated pins 28 via ball bearings 29. The pins 28 are in turn fixedly mounted between the flanges of a U section 30 which, in practice, preferably is associated with or forms part of the guide member 24 mentioned above. The guide member 24 suitably has the shape of a box section having a groove 31 into which the rod 21 extends, the rod being provided at its free end with a wheel which is mounted in bearings and which can roll smoothly on the walls of the guide member. Outside the guide members 24, the rod 21, has a sleeve 32 mounted on bearings, the rod being freely rotatable relative to the sleeve. The two opposite ends of a pull rope 33 which is passed over upper and lower guide rollers 34 and 35, respectively, are connected with said sleeve 32.

The arrangement described above functions in the following way. When the star wheel 25 has taken its lower end position indicated by full lines in FIG. 4 and corresponding to the state which is shown in FIG. 1 and in which the side portion 13 is completely lowered, one projection of the star wheel engages between rollers 27 which are located relatively close together. When the rope or band 33 is pulled in the direction of the arrow shown in FIG. 3, the rod 21 and the section 20 nonrotatably connected therewith are positively moved upwardly along the vertical path of motion defined by the guide member 24. During this rectilinear movement of the rod 21, the star wheel 25 is forced to engage with the rollers 27 mounted in succession, while causing the rod 21 and the section 20 to rotate simultaneously as both the upper half 13' and the lower half 13" of the cover side portion 13 are rolled up. Since the rollers 27 at first are comparatively close together, the section 20 is first rotated at a relatively high speed. Since the mutual distances between the rollers 27 successively increase upwardly along the guide member, the speed of the star wheel and the accompanying section 20 successively decreases, however, and thus compensates for the cover build-up on the section 20, which occurs as the cover is being rolled up on the section, whereby the piece of the cover upper half 13', which extends between the fixed upper edge 22 and the section 20, is kept neatly extended, but is not stretched to such an extent that further rolling up is rendered impossible.

In its upper end position indicated by dash-dot lines in FIG. 4, the star wheel 25 can be located with a lower projection 26 positioned slightly above a horizontal plane through the centre of an underlying roller 27'. As a result, a self-locking of the section 20 is obtained in the upper end position thereof shown in FIG. 2, the section being releasable from its locked position by a strong pull on the pull rope 33, whereby the downwardly pointing projection 26 of the star wheel passes the roller 27', such that the wheel is again free to rotate. After the section 20 has been released from its locked upper end position, the side portion is unrolled from the section in that the section falls down by its own weight and that of the cover, while being guided along the guide member 24.

I claim:

1. A door structure including a retractable cover, said cover comprising:
    a cover portion, a rolling-up section extending transversely along a center line of said cover portion, said cover portion nonrotatably connected to said rolling-up section;
    means for rotating said rolling-up section, said means including a guide member for guiding one end of said rolling-up section, a toothed element non-rotatably mounted at said one end of said rolling-up section, a plurality of tooth engaging members spaced along said guide member for successive engagement by teeth on said toothed element, from a first, unrolled, position to a second, rolled, position, said tooth engaging members spaced at progressively increased distances from said unrolled position to said rolled position; and
    means of pulling said rolling-up section in said guide member engagement between said toothed element and said tooth engaging members resulting in rotation of said toothed element and said attached cover portion, movement of said rolling-up section in one direction rotating said rolling-up section in a first direction and movement of said rolling-up section in the other direction rotating said rolling up section in a second opposite direction.

2. A door structure as claimed in claim 1, said tooth engaging members comprising rollers rotatably mounted on pins.

3. A door structure as claimed in claim 1, said means for pulling said rolling up section comprising a rope extending over at least one guide roller, and a sleeve rotatably mounted on said one end of said rolling-up section, said rope attached to said sleeve.

4. A door structure as claimed in claim 3, said rope in the form of a loop, and having opposed ends, said ends attached to said sleeve.

5. A door structure as claimed in claim 1, including a roof portion and at least one end portion, said cover portion connected at one transverse edge to said roof portion.

* * * * *